United States Patent
Kobayashi et al.

(10) Patent No.: US 8,413,639 B2
(45) Date of Patent: Apr. 9, 2013

(54) FUEL SUPPLYING APPARATUS FOR INTERNAL COMBUSTION ENGINE

(75) Inventors: Takao Kobayashi, Wako (JP); Eishi Sogo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 119 days.

(21) Appl. No.: 13/191,908

(22) Filed: Jul. 27, 2011

(65) Prior Publication Data
US 2012/0048872 A1    Mar. 1, 2012

(30) Foreign Application Priority Data
Sep. 1, 2010  (JP) .................................. 2010-195698

(51) Int. Cl.
*F02M 37/00*    (2006.01)
(52) U.S. Cl. ..................... 123/511; 123/572; 123/495
(58) Field of Classification Search .......... 123/511, 123/495, 572–574, 41.86, 437
See application file for complete search history.

(56) References Cited

U.S. PATENT DOCUMENTS

| | | | | |
|---|---|---|---|---|
| 3,952,719 A | * | 4/1976 | Fenton et al. | 123/198 DB |
| 8,123,829 B2 | * | 2/2012 | Sato et al. | 55/385.3 |
| 2010/0037868 A1 | * | 2/2010 | Ono et al. | 123/511 |
| 2011/0303196 A1 | * | 12/2011 | Kobayashi | 123/495 |

FOREIGN PATENT DOCUMENTS
JP        4310294 B2    8/2009

* cited by examiner

*Primary Examiner* — M. McMahon
(74) *Attorney, Agent, or Firm* — Westerman, Hattori, Daniels & Adrian, LLP

(57) ABSTRACT

A fuel supplying apparatus that opens a fuel supply path using a negative pressure in a crankcase of an internal combustion engine is disclosed. A negative pressure introducing inlet of an automatic cock is connected to the crankcase of the internal combustion engine through a negative pressure communication path. A negative pressure generated in the crankcase opens an automatic cock and, thereby, the fuel supply path is opened that is to supply fuel from a fuel tank to the internal combustion engine. The negative pressure communication path communicates with a communication opening of an air cleaner through a purge path that branches from the negative pressure communication path at a halfway point thereof. The communication opening is disposed on a cleaning chamber that is formed in an air cleaner such that air filtered by an air filter flows into the communication opening. An airflow resistance increasing unit is disposed only in the inside of the communication opening, for setting an airflow resistance of the purge path to be higher than an airflow resistance of the negative pressure communication path.

3 Claims, 8 Drawing Sheets

FUEL SUPPLYING APPARATUS FOR INTERNAL COMBUSTION ENGINE

FIELD OF THE INVENTION

The present invention relates generally to a fuel supplying apparatus for an internal combustion engine and, more particularly, to a technique of opening a fuel supply path using a negative pressure in a crankcase.

BACKGROUND OF THE INVENTION

Types of scheme of supplying fuel from a fuel tank to an intake system of an internal combustion engine include a scheme of supplying fuel by using a fuel pump and a scheme of supplying fuel by using the gravity. According to the scheme of supplying fuel using the gravity, a fuel tank is disposed above a carburetor and the fuel is supplied from the fuel tank to the carburetor. Therefore, this scheme is often used because the configuration therefor is relatively simple.

In the case of the scheme of supplying fuel using the gravity, an automatic cock is disposed in a fuel supply path to supply the fuel from the fuel tank to the carburetor. The automatic cock is a valve that opens the fuel supply path using a negative pressure in a crankcase. During the operation of an internal combustion engine, a negative pressure is generated in the crankcase associated with a reciprocating motion of a piston (more correctly, a high negative pressure and a micro positive pressure are alternately and repeatedly generated). The automatic cock is opened by this negative pressure and the fuel in the fuel tank flows into the carburetor through the fuel supply path.

A common internal combustion engine rakes up a lubricating oil stored in the crankcase upward to splash the lubricating oil and, thereby, generates oil mist to lubricate a portion to be slid that is accommodated in the crankcase. This is not preferable because the oil mist adheres to parts in the automatic cock when the oil mist intrudes into the automatic cock.

In contrast, a fuel supplying apparatus is known as is disclosed in, for example, Japanese Patent Publication No. 4310294, that is adapted to suppress the intrusion of the oil mist into a negative pressure introducing inlet of the automatic cock. The fuel supplying apparatus is configured to connect a crankcase to an intake system through a gas/liquid separating apparatus, a breather path, and a reed valve and to connect a branch outlet that branches from the breather path to the negative pressure introducing inlet of the automatic cock.

When a positive pressure is generated in the crankcase, the reed valve is opened by the positive pressure. Oil mist and blowby gas produced in the crankcase are caused to circulate from the crankcase into the intake system and, thereby, are combusted in a combustion chamber. On the other hand, when a negative pressure is generated in the crankcase, the automatic cock is opened by this negative pressure. The fuel in the fuel tank is supplied to the carburetor through the fuel supply path.

The gas/liquid separating apparatus is positioned between the crankcase and the breather path, and separates the oil mist produced in the crankcase from the air. Therefore, the intrusion is suppressed of the oil mist into the negative pressure introducing inlet of the automatic cock through the breather path. In addition, the automatic cock is positioned immediately and exactly above the crankcase. Therefore, even if the oil mist starts to intrude into the negative pressure introducing inlet of the automatic cock, the oil mist tends to flow out into the breather path thereunder due to the gravity.

When the automatic cock is disposed immediately and exactly above the crankcase being adjacent thereto, the thermal influence needs to be fully taken into consideration that is caused by the heat dissipation of the internal combustion engine. When the automatic cock is disposed above the crankcase far away therefrom to avoid receiving the thermal influence, the degree of freedom of disposing the fuel supplying apparatus is reduced and, therefore, this is not preferable. In addition, the fuel supplying apparatus employs the scheme of supplying the fuel by using the gravity and, therefore, the fuel tank is positioned above the automatic cock. Especially, for a configuration that has an internal combustion engine and a fuel supplying apparatus incorporated as one unit such as, for example, a small sound-proof engine-driven generator, the height of the unit as a whole is often limited. To suppress the total height, it is considered to make the fuel tank thin. However, this result in reducing the capacity of the fuel tank and, therefore, this is not an advisable solution.

An improvement as below can be considered. During the operation of the internal combustion engine, the negative pressure in the crankcase is higher than the negative pressure in the air cleaner and, therefore, the difference between the negative pressures is usable. The improvement is as follows: the negative pressure introducing inlet of the automatic cock is connected to the crankcase using a first hose; a second hose is caused to branch from the first hose at a halfway point thereof; and the first hose and the air cleaner is caused to communicate with each other by the second hose. An airflow resistance increasing unit is disposed in the second hose to set the airflow resistance of the second hose to be higher than the airflow resistance of the first hose. The air in the air cleaner flows from the second hose into the crankcase through the first hose and, therefore, suppresses the intrusion of the oil mist in the crankcase into the negative pressure introducing inlet of the automatic cock to avoid the intrusion.

However, when the second hose is detached from the air cleaner or the first hose or when the second hose is broken, the external air receives an intake resistance due to the airflow resistance increasing unit and, therefore, is difficult to be sucked into the first hose. The negative pressure state of the first hose does not substantially vary and, therefore, the automatic cock maintains its opened state and the internal combustion engine maintains its operating state. Dust included in the external air may intrude from the first hose into the crankcase of the internal combustion engine. Because the internal combustion engine is in its operating state, the dust included in the external air may intrude into the combustion chamber of the internal combustion engine through the air cleaner. This phenomenon is disadvantageous for improving the durability of the internal combustion engine.

SUMMARY OF THE INVENTION

An object of the present invention is to provide a fuel supplying apparatus which is capable of suppressing intrusion of oil mist into a negative pressure introducing inlet of an automatic cock and of securing durability of an internal combustion engine.

According to an aspect of the present invention, there is provided a fuel supplying apparatus comprising: a fuel tank for storing a fuel to be supplied to an internal combustion engine; an automatic cock connected to the fuel tank and having a negative pressure introducing inlet; a negative pressure communication path connecting the negative pressure introducing inlet with a crankcase of the internal combustion engine; and a fuel supply path that is opened by a negative pressure, generated in the crankcase, to supply the fuel from the fuel tank to the internal combustion engine, wherein the negative pressure communication path communicates with a communication opening of an air cleaner through a purge path branched from the negative pressure communication path, the communication opening is disposed in a cleaning chamber formed in the air cleaner so that air filtered by an air filter of the air cleaner flows into the communication opening, and an airflow resistance increasing unit for setting an airflow resistance of the purge path to be larger than an airflow resistance of the negative pressure communication path is disposed only within the communication opening.

The fuel supplying apparatus of the present invention uses a property of an internal combustion engine that, during operation thereof, generally, a pressure in a crankcase is lower than a pressure in a cleaning chamber of an air cleaner. This means that the negative pressure in the crankcase is higher than that in the cleaning chamber.

According to the present invention, the purge path branches from the negative pressure communication path at the halfway point of the negative pressure communication path, and the negative pressure communication path and the cleaning chamber are caused to communicate with each other by the purge path. Therefore, the air in the cleaning chamber flows from the purge path into the crankcase passing through the negative pressure communication path. Therefore, the intrusion of the oil mist into the negative pressure communication path is able to be excluded (purged) by the air in the cleaning chamber. As a result, the intrusion is able to be suppressed of the oil mist in the crankcase, into the negative pressure introducing inlet of the automatic cock passing through the negative pressure communication path.

An airflow resistance increasing unit is retained in the inside of the communication opening that is disposed on the cleaning chamber to communicate with the purge path. The airflow resistance increasing unit sets the airflow resistance of the purge path to be higher than the airflow resistance of negative pressure communication path by setting the airflow resistance of the communication opening to be high. The airflow resistance of the purge path is set to be high by the airflow resistance increasing unit and, thereby, the pressure loss of the purge path as a whole (including the communication opening) is increased. As a result, at the branching point, the pressure difference can be set to be an optimal value between the internal pressure of the negative pressure communication path and the internal pressure of the purge path. Because the pressure difference is proper, the negative pressure state in the negative pressure communication path is not offset by the pressure of the air that flows from the purge path to the negative pressure communication path. Therefore, the negative pressure of the negative pressure communication path can sufficiently be secured that acts to open the automatic cock and, therefore, the automatic cock can suitably be opened and closed.

The airflow resistance increasing unit is retained only in the inside of the communication opening and no such unit is retained in the purge path. Therefore, when the purge path is detached from the communication opening or the negative pressure communication path, or when the purge path is broken, the external air receives no intake resistance by the airflow resistance increasing unit and is, as it is, sucked into the negative pressure communication path. The negative pressure of the negative pressure communication path is offset by the pressure of the external air (the atmospheric pressure) that flows into the negative pressure communication path. Therefore, the negative pressure of the negative pressure communication path can not sufficiently be secured, that acts to cause the automatic cock to open and, therefore, the automatic cock automatically closes. The supply of the fuel from the fuel tank to the internal combustion engine is blocked and, therefore, the internal combustion engine stops its operation. An operator who operates the internal combustion engine can quickly get aware of the stoppage of the operation of the internal combustion engine without intending to and, therefore, the operator can quickly cope with the stoppage.

In addition, the negative pressure state in the negative pressure communication path is cancelled and, therefore, dust included in the external air is not sucked into the negative pressure communication path and does not intrude into the crankcase. The negative pressure state in the cleaning chamber is cancelled due to the stoppage of the operation of the internal combustion engine and, therefore, the dust included in the external air does not intrude from the communication opening into the combustion chamber of the internal combustion engine through the cleaning chamber. Therefore, the airflow resistance increasing unit is advantageous for improving the durability of the internal combustion engine.

Preferably, the negative pressure communication path has a point at which the purge path branches and the branching point is set to be at the lowest point of the negative pressure communication path so that the point is able to collect the oil mist that intrudes from the crankcase.

As above, the point at which the purge path branches from the negative pressure communication path is set to be at the lowest point of the negative pressure communication path such that the point is able to collect the oil mist that intrudes from the crankcase. Even if the oil mist intrudes from the crankcase into the negative pressure communication path, the oil mist intruding gathers at the lowest point of the negative pressure communication path. Therefore, even when the automatic cock is not disposed above the crankcase, the intrusion is able to be suppressed of the oil mist into the negative pressure introducing inlet of the automatic cock. The automatic cock does not need to be disposed above the crankcase and, therefore, the positions of the automatic cock and the fuel tank are able to arbitrarily be set at positions at which no thermal influence is received that is caused by the heat dissipation from the internal combustion engine. Therefore, the degree of freedom of disposition of the fuel tank and the fuel supplying apparatus is able to be increased.

Even when the height is limited for disposing the fuel tank, the capacity of the fuel tank can sufficiently be secured by disposing the fuel tank at a proper position. For example, even when the internal combustion engine and the fuel supplying apparatus are incorporated as one unit and the height of the unit as a whole is limited, the capacity of the fuel tank can sufficiently be secured by properly setting the position of the fuel tank.

Desirably, the communication opening is located at the position that is lower than that of the branching point. Therefore, the oil mist gathering at the lowest point of the negative pressure communication path enters the cleaning chamber of the air cleaner passing through the purge path due to the gravity. The oil mist entering the cleaning chamber is combusted in the combustion chamber. As a result, the intrusion of the oil mist into the negative pressure introducing inlet of the automatic cock can further be suppressed.

BRIEF DESCRIPTION OF THE DRAWINGS

A preferred embodiment of the present invention will now be described in detail with reference to the accompanying drawings, in which.

DETAILED DESCRIPTION OF THE PREFERRED EMBODIMENT

Figures 1A, 1B:
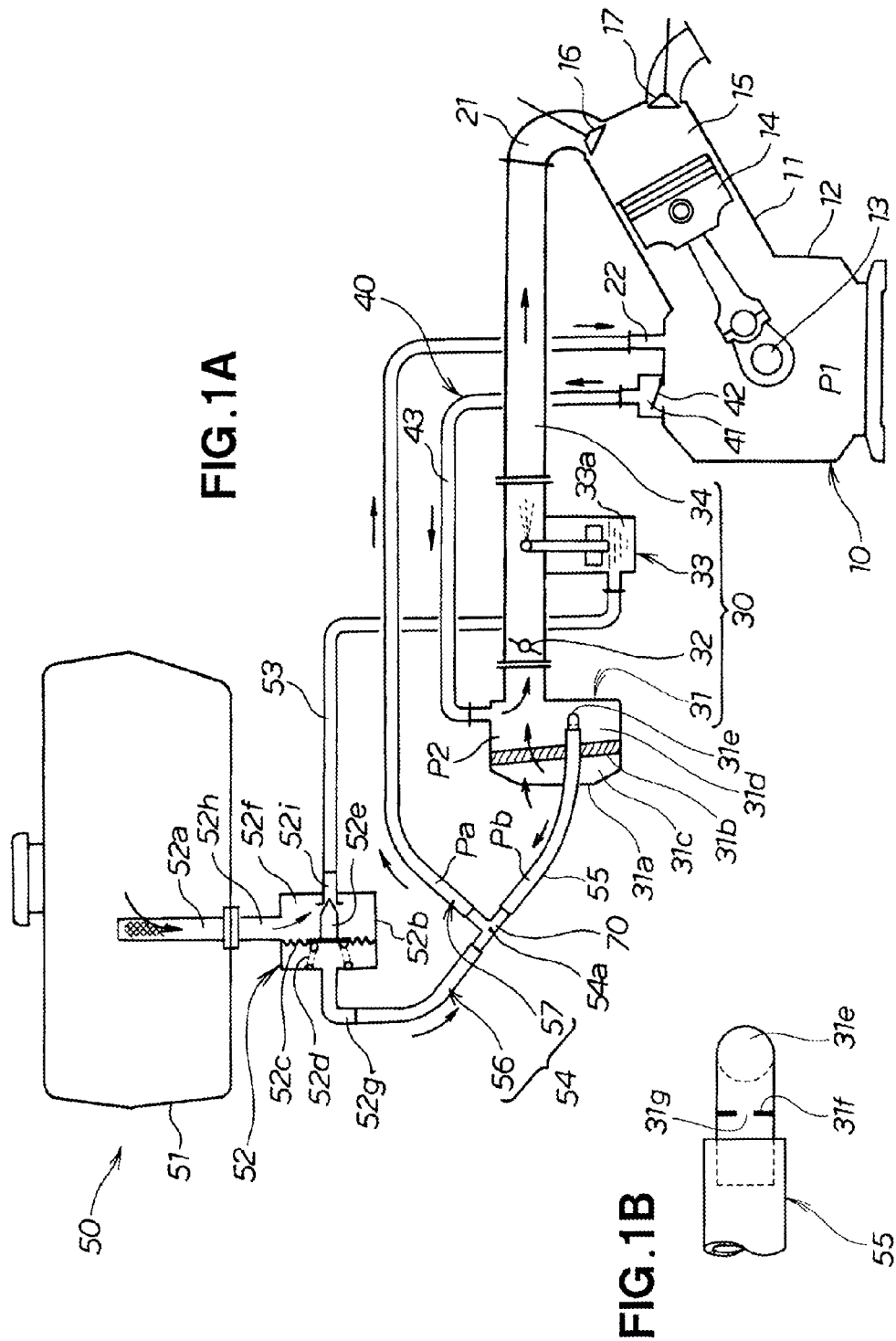
FIG. 1A is a schematic diagram illustrating an internal combustion engine including a fuel supplying apparatus according to an embodiment of the present invention.
FIG. 1B is an enlarged view showing a communication opening of FIG. 1A.

Reference is now made to FIG. 1A schematically showing an internal combustion engine 10 that includes a fuel supplying apparatus 50. As depicted in FIG. 1A, the internal combustion engine 10 is configured by, for example, a transverse single-cylinder four-cycle engine. The internal combustion engine 10 includes: a crankcase 12 that integrally has a cylinder 11, a crank shaft 13, a piston 14, a combustion chamber 15, an intake valve 16, and an exhaust valve 17. The crank shaft 13 is horizontally disposed. The cylinder 11 is inclined upward.

An intake system 30 for the internal combustion engine 10 includes an air cleaner 31, a throttle valve 32, a carburetor 33, and an intake pipe 34. The carburetor 33 has a float chamber 33a that temporarily retains fuel. The intake pipe 34 is connected to an intake inlet 21 of the internal combustion engine 10.

Figure 2:
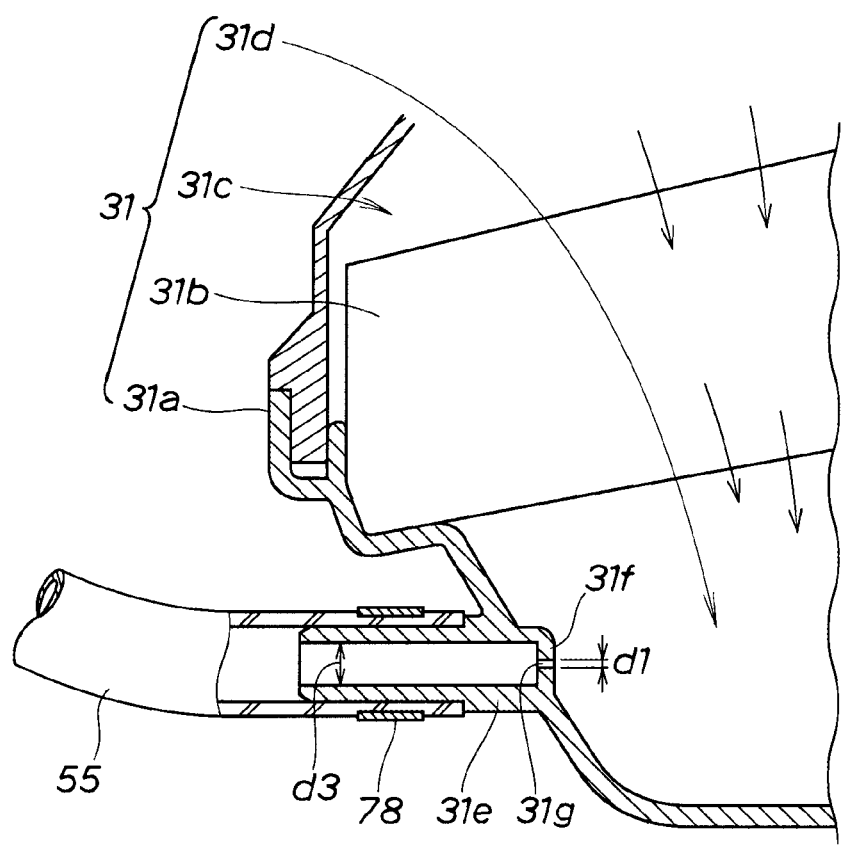
FIG. 2 is a cross-sectional view showing an air cleaner of FIG. 1A.

As depicted in FIGS. 1A and 2, the air cleaner 31 is configured by a cleaner box 31a, an air filter 31b that is accommodated in the cleaner box 31a, and a dust chamber 31c and a cleaning chamber 31d that are formed by partitioning the inside of the cleaner box 31a by the air filter 31b. The dust chamber 31c is a space that is formed in the air cleaner 31, that is, in the cleaner box 31a to introduce the external air (the air before being filtered by the air filter 31b). The cleaning chamber 31d is a space that is formed in the air cleaner 31, that is, in the cleaner box 31a for the external air in the dust chamber 31c to flow thereinto after being filtered by the air filter 31b.

A communication opening 31e is disposed on the cleaning chamber 31d. FIG. 1B depicts in an enlarged form the communication opening 31e that is depicted in FIG. 1A. As depicted in FIGS. 1B and 2, the communication opening 31e is configured by a pipe of a predetermined length and is a male joint to be inserted into a hose. The hole diameter of the communication opening 31e is "d3".

As depicted in FIG. 1A, in the internal combustion engine 10, a portion of combustion gas produced in the combustion chamber 15 leaks from a point between the cylinder 11 and the piston 14 into the crankcase 12. The combustion gas leaking is referred to as "blowby gas". The blowby gas includes a large amount of oil mist and carbon hydrides (HC). To lubricate a sliding part that is accommodated in the crankcase 12, a lubricating oil in the crankcase 12 is raked up upward to be splashed around and, thereby, oil mist may be produced in the crankcase 12. The blowby gas and the oil mist can not be released as they are into the atmosphere.

Therefore, the internal combustion engine 10 of the embodiment includes a blowby gas returning system 40 to return the blowby gas and the oil mist to the combustion chamber 15 through the intake system 30. The blowby gas returning system 40 connects the crankcase 12 to the cleaning chamber 31d of the air cleaner 31 through a breather chamber 41, a reed valve 42, and a breather path 43. The breather chamber 41 is formed in the top portion of the crankcase 12. The reed valve 42 is a one-way valve to open and close the breather path 43, is closed in the usual state, and opens only when a positive pressure is generated in the crankcase 12. The breather path 43 is configured by a hose that connects the breather chamber 41 to the air cleaner 31.

During the operation of the internal combustion engine 10, a high negative pressure and a micro positive pressure are alternately and repeatedly generated associated with a reciprocating motion of the piston 14. When the positive pressure is generated in the crankcase 12, the blowby gas and the oil mist generated in the crankcase 12 are returned to the cleaning chamber 31d of the air cleaner 31 and, thereby, are returned into the intake system 30. As a result, the blowby gas and the oil mist are supplied together with combustion air, from the intake system 30 to the combustion chamber 15 and are again combusted.

Figure 3:
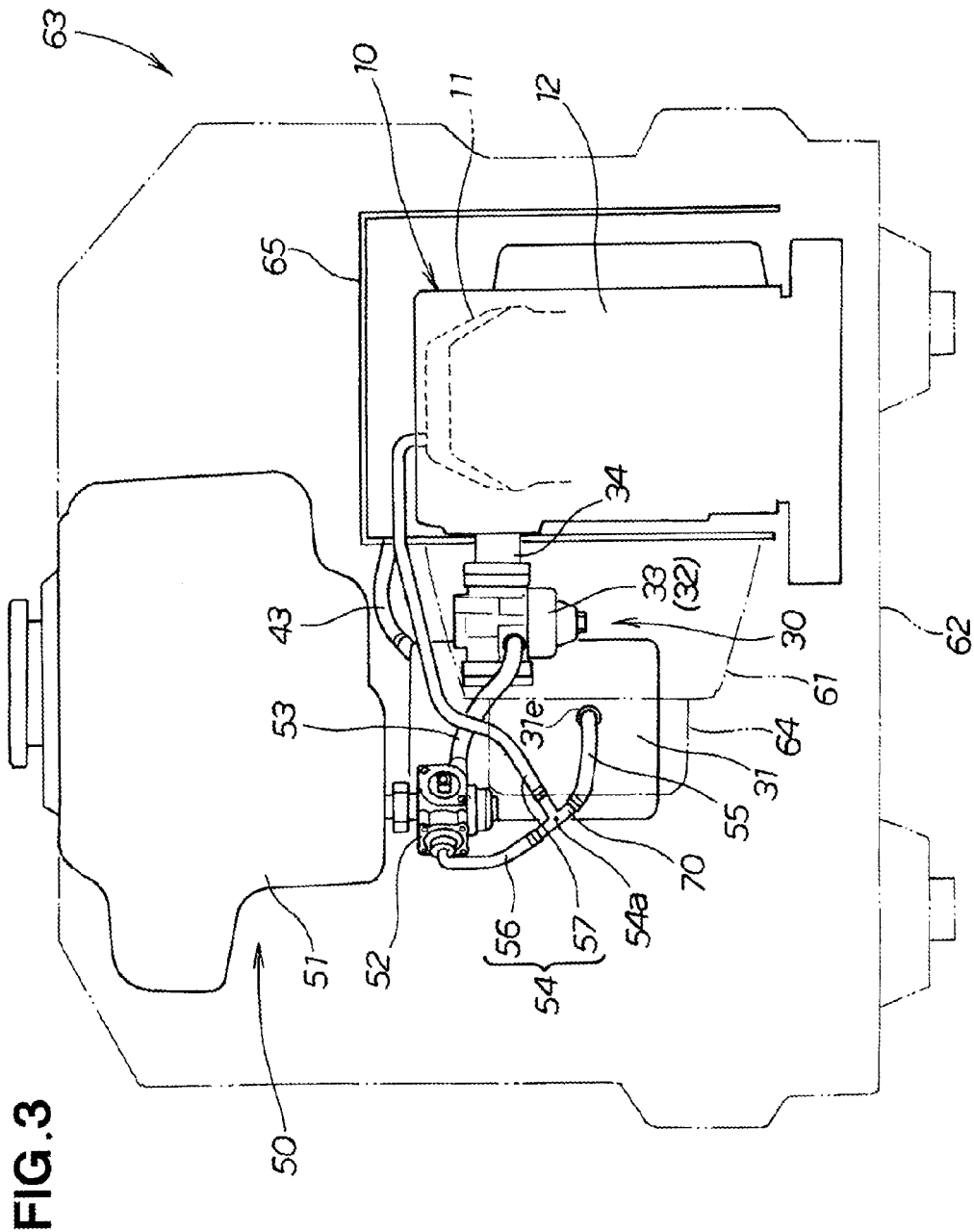
FIG. 3 is a side view of the internal combustion engine employing the fuel supplying apparatus of FIG. 1A.

As depicted in FIGS. 1A and 3, the fuel supplying apparatus 50 for the internal combustion engine 10 according to the embodiment employs the scheme of supplying fuel by using the gravity. The fuel supplying apparatus is configured by a fuel tank 51, an automatic cock 52, a fuel supply path 53, and a negative pressure communication path 54. More specifically, the fuel supplying apparatus 50 has the fuel tank 51 disposed above the carburetor 33 and supplies fuel from the fuel tank 51 to the carburetor 33 (more specifically, the float chamber 33a of the carburetor 33).

As depicted in FIG. 1A, the automatic cock 52 is a valve that automatically opens to open the fuel supply path 53 using the negative pressure in the crankcase 12. The automatic cock 52 includes an oil filter 52a, a case 52b, a diaphragm 52c, a return spring 52d, and a valve body 52e. The oil filter 52a filters the fuel that is supplied from the fuel tank 51, and guides the filtered fuel into the case 52b. The case 52b accommodates the diaphragm 52c, the return spring 52d, and the valve body 52e. The diaphragm 52c is a valve driving body that opens and closes the valve body 52e in a valve chamber 52f in the case 52b. The return spring 52d biases the diaphragm 52c in a direction to close the valve body 52e in the usual state where no negative pressure acts on a negative pressure introducing inlet 52g.

The case 52b further includes the negative pressure introducing inlet 52g, a fuel entrance 52h, and a fuel exit 52i. The negative pressure introducing inlet 52g is connected to a communication opening 22 of the crankcase 12 by the negative pressure communication path 54. The communication opening 22 is formed in the top portion of the crankcase 12. The fuel entrance 52h is connected to the fuel tank 51. The fuel exit 52i is connected to the float chamber 33a by the fuel supply path 53. The fuel supply path 53 and the negative pressure communication path 54 are each formed by a hose. As depicted in FIGS. 3 to 6, the fuel supply path 53 is inclined downward from the fuel exit 52i toward the float chamber 33a.

As depicted in FIG. 1A, during the operation of the internal combustion engine 10, a high negative pressure and a micro positive pressure are alternately and repeatedly generated in the crankcase 12 associated with the reciprocating motion of the piston 14. When a predetermined negative pressure set in advance acts from the crankcase 12 on the negative pressure introducing inlet 52g, the diaphragm 52c opens the valve body 52e resisting the biasing force of the return spring 52d. When the negative pressure is generated in the crankcase 12, the automatic cock 52 automatically opens due to this negative pressure. As a result, the fuel in the fuel tank 51 is supplied due to the gravity to the float chamber 33a through the oil filter 52a, the fuel entrance 52h, the valve chamber 52f, the fuel entrance 52i, and the fuel supply path 53. The fuel supplied to the float chamber 33a is sprayed into the carburetor 33, thereby, is mixed with the combustion air, and, thereafter, is supplied to the intake inlet 21 of the internal combustion engine 10.

Figure 4:
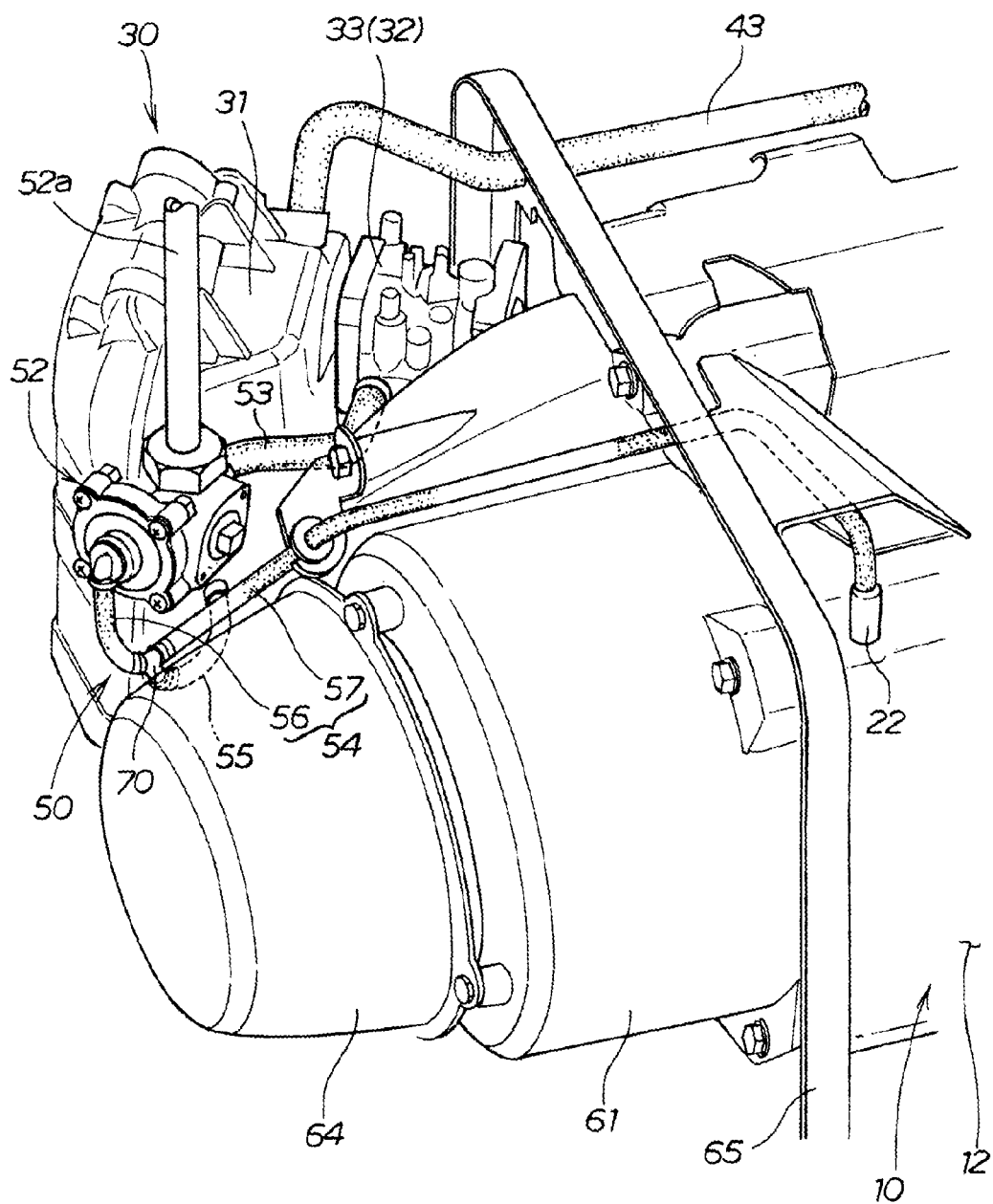
FIG. 4 is a perspective view showing a relation between the fuel supplying apparatus and the internal combustion engine of FIG. 3.
Figure 5:
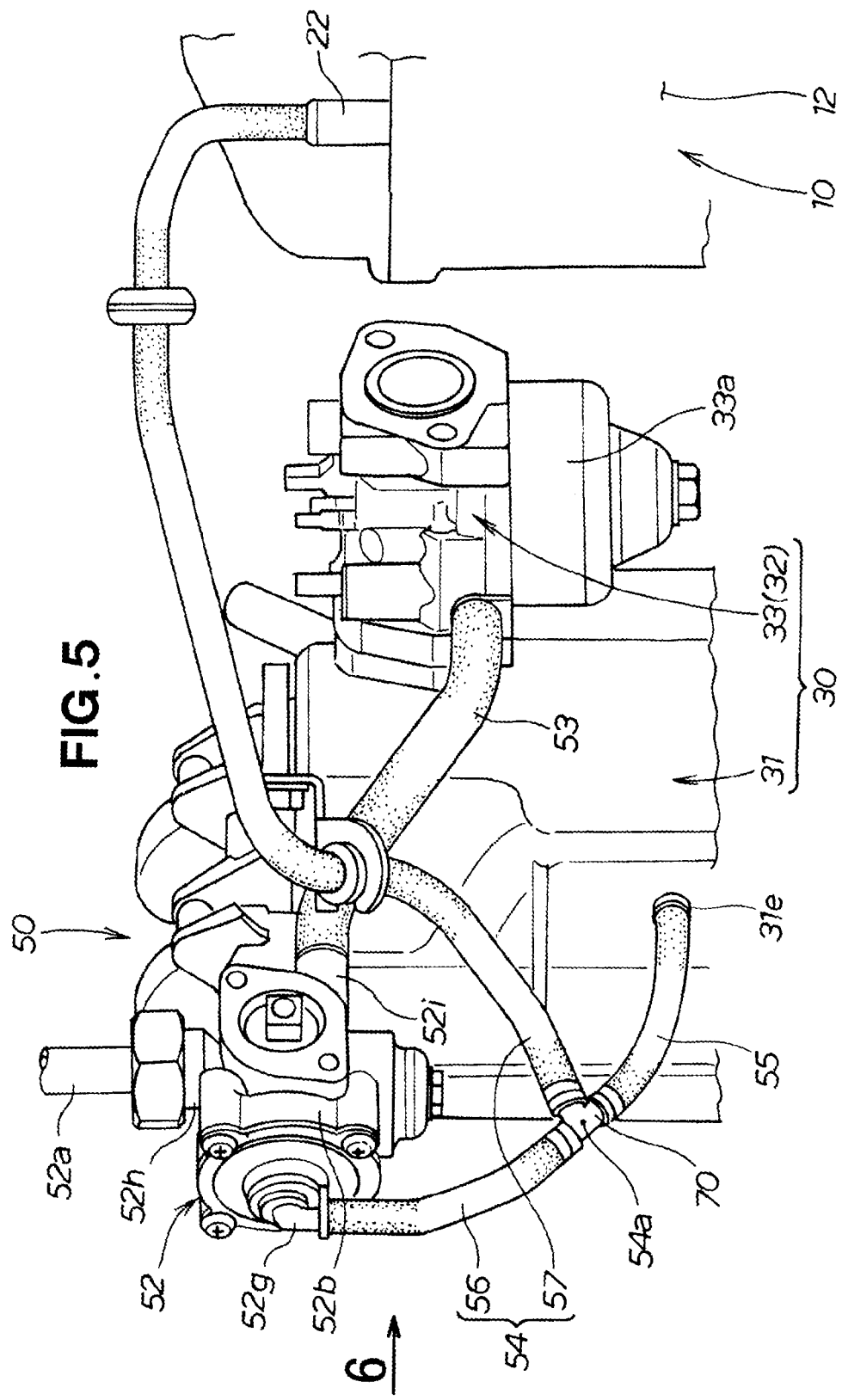
FIG. 5 is a side view showing a relation between an intake system and the fuel supplying apparatus of FIG. 3.
Figure 6:
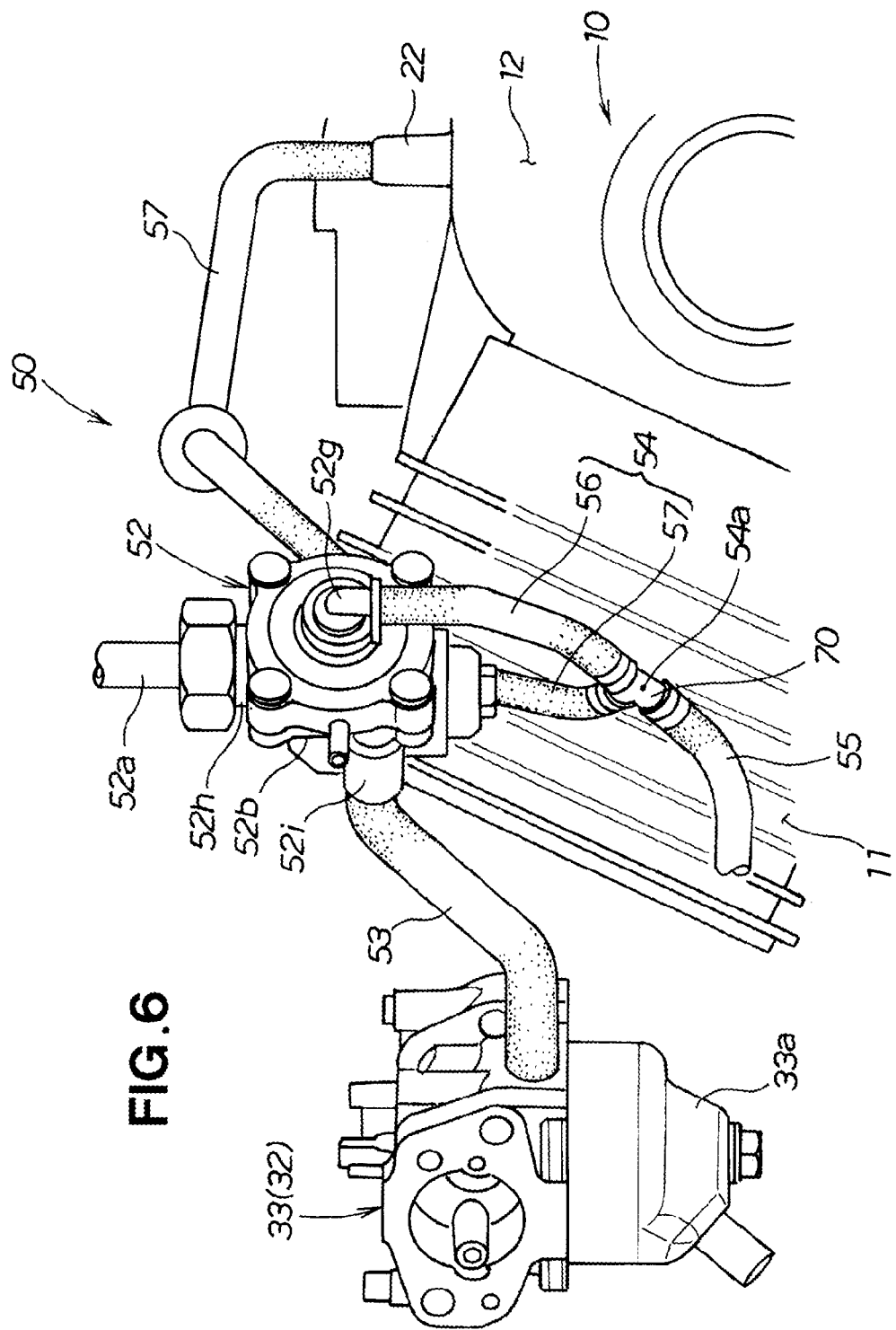
FIG. 6 is a view showing a relation among the internal combustion engine, a carburetor, and an automatic cock, as seen in the direction of arrow 6 of FIG. 5.

As depicted in FIGS. 3 and 4, the internal combustion engine 10 is incorporated in a frame 62 together with an electric generator 61, the fuel tank 51, and a muffler not depicted. A unit incorporated to be one in this manner is referred to as "electric generator unit 63". The internal combustion engine 10 has the electric generator 61 and a recoil starter 64 that are integrally incorporated in a side portion thereof. The electric generator 61 is directly coupled to the crank shaft 13 (FIG. 1A) and, thereby, is driven by the internal combustion engine 10. The periphery of the internal combustion engine 10 is covered with a heat-shielding cover 65.

As depicted in FIGS. 3 and 4, beside the internal combustion engine 10, the intake system 30 is positioned being placed beside the electric generator 61 and the recoil starter 64. The fuel tank 51 is positioned exactly above the intake system 30, that is, exactly above the air cleaner 31 and the carburetor 33. The automatic cock 52 is positioned exactly under the fuel tank 51 and is placed beside the top portion of the air cleaner 31. The automatic cock 52 is positioned in the vicinity of the air cleaner 31 and the recoil starter 64.

As depicted in FIGS. 3 to 6, the negative pressure communication path 54 including hoses is connected to the negative pressure introducing inlet 52g and the communication opening 22 therebetween in the state where the negative pressure communication path 54 is loose to take a substantial V-shape as its side view. Of the negative pressure communication path 54, a portion 54a at the bottom thereof having a substantial V-shape as its side view, that is, the halfway point of the negative pressure communication path 54 is at the lowest point of the negative pressure communication path 54. The portion 54a at the bottom and having the V-shape is hereinafter instead referred to as "the lowest point 54a of the negative pressure communication path 54".

Describing with reference also to FIG. 1A, the negative pressure communication path 54 communicates with a communication opening 31e of the air cleaner 31 through a purge path 55 that branches from the path at a halfway point thereof (the lowest point 54a of the negative pressure communication path 54). The purge path 55 is configured by a hose. The point at which the purge path 55 branches from the negative pressure communication path 54 is positioned at the lowest point 54a of the negative pressure communication path 54. Therefore, the point is able to collect the oil mist that intrudes from the crankcase 12 into the negative pressure communication path 54. Hereinafter, the lowest point 54a of the negative pressure communication path 54 is instead referred to as "point 54a at which the purge path 55 branches from the negative pressure communication path 54" when suitable.

The point 31e at which the purge path 55 is connected to the air cleaner 31, that is, the communication opening 31e is located at a position that is lower than that of the branching point 54a. The configuration presents a substantial Y-shape as its side view, that is formed by connecting the purge path 55 to the bottom of the negative pressure communication path 54 having the substantial V-shape as its side view.

Figure 7:
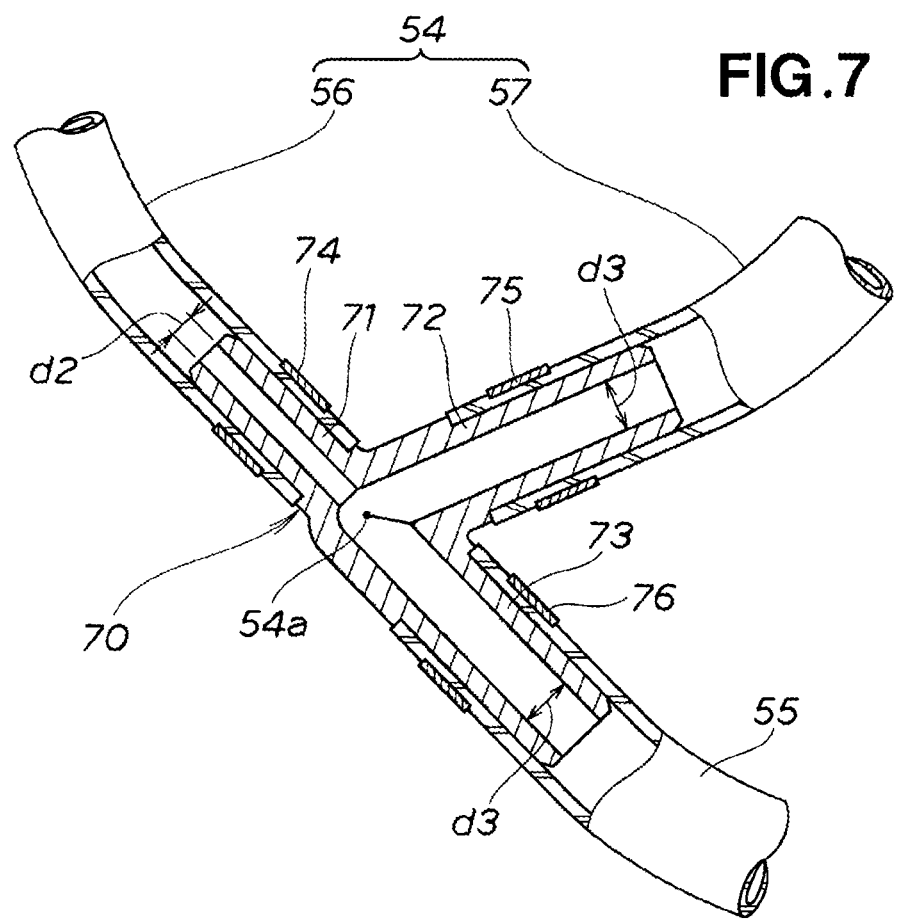
FIG. 7 is a view showing a portion of a negative pressure communication path and a purge path branched therefrom.

The configuration around the branching point 54a will be described in more detail. As depicted in FIGS. 1A and 7, the negative pressure communication path 54 is divided into two along the longitudinal direction of the hose at the lowest point 54a and these divided portions are connected to each other by a hose joint 70 having a T-shape or a Y-shape. The negative pressure communication path 54 includes a first communication path 56 that is connected to the negative pressure introducing inlet 52g of the automatic cock 52, and a second communication path 57 that is connected to the communication opening 22 of the crankcase 12.

As depicted in FIG. 7, the hose joint 70 is a kind of pipe joint to connect three hoses to each other in a substantially T shape or a substantially Y shape and integrally has a first, a second, and a third joint units 71, 72, and 73. The second joint unit 72 extends to the first joint unit 71 in a direction for the second joint unit 72 to cross the first joint unit 71. Preferably, the internal angle formed by the first and the second joint units 71 and 72 is in a range of 100° to 120°. The third joint unit 73 extends in a direction for the third joint unit 73 to be aligned substantially on a straight line with the first joint unit 71. The joint units 71 to 73 each are a male joint to be inserted into a hose. The hole diameter of the first joint unit 71 is "d2". The hole diameter of each of the second and the third joint units 72 and 73 is same as the hole diameter of the communication opening 31e that is "d3", and is designed to be larger than the hole diameter d2 of the first joint unit 71.

The first joint unit 71 is inserted into an end of the first communication path 56 (first hose) and these components are clamped by a hose band 74. The second joint unit 72 is inserted into an end of the second communication path 57 (second hose) and these components are clamped by a hose band 75. The third joint unit 73 is inserted into an end of the purge path 55 (third hose) and these components are clamped by a hose band 76.

When the purge path 55 and the first and the second communication paths 56 and 57 are fitted to the hose joint 70, the third joint unit 73 is located at a position that is lower than those of the first and the second joint units 71 and 72. The branching point 54a of the first, the second, and the third joint units 71, 72, and 73 corresponds to the point 54a at which the purge path 55 branches from the negative pressure communication path 54.

As depicted in FIG. 2, the communication opening 31e of the air cleaner 31 is inserted with the other end of the purge path 55 (third hose) and these components are clamped by a hose band 78. The communication opening 31e has an airflow resistance increasing unit 31f. The airflow resistance increasing unit 31f sets the airflow resistance of the purge path 55 to be higher than that of the negative pressure communication path 54 and is retained only in the communication opening 31e. More specifically, the airflow resistance increasing unit 31f is configured by, for example, an orifice plate that is formed inside the communication opening 31e. The orifice plate 31f (airflow resistance increasing unit 31f) is a flat plate that intervenes in the piping path of the communication opening 31e, and has one small hole 31g (orifice 31g) in the center thereof such that a differential pressure is generated between the upstream side and the downstream side thereof. The diameter "d1" of the small hole 31g is set to be smaller than the hole diameter d2 of the first joint unit 71 and also smaller than the hole diameter d3 of the communication opening 31e.

Actions of the fuel supplying apparatus according to the embodiment will be described.

As depicted in FIGS. 1A and 1B, the fuel supplying apparatus according to the embodiment uses a property that, during the operation of the internal combustion engine 10, a pressure P1 in the crankcase 12 is generally lower than a pressure P2 in the cleaning chamber 31d of the air cleaner 31. The negative pressure in the crankcase 12 is higher than that in the cleaning chamber 31d.

According to the embodiment, the purge path 55 branches from the negative pressure communication path 54 at the halfway point thereof and the purge path 55 communicates the negative pressure communication path 54 and the cleaning chamber 31d with each other. Therefore, the air in the cleaning chamber 31d flows from the purge path 55 into the crankcase 12 passing through the negative pressure communication path 54. Therefore, the intrusion of the oil mist into the negative pressure communication path 54 can be excluded (purged) by the air in the cleaning chamber 31d. As a result, it is suppressed for the oil mist in the crankcase 12 to pass through the negative pressure communication path 54 and intrude into the negative pressure introducing inlet 52g of the automatic cock 52.

In addition, according to the embodiment, the point 54a at which the purge path 55 branches from the negative pressure communication path 54 is set to be at the lowest point of the negative pressure communication path 54 to be able to collect the oil mist that intrudes from the crankcase 12 into the negative pressure communication path 54. Even when the oil mist intrudes from the crankcase 12 into the negative pressure communication path 54, the oil mist intruding gathers at the lowest point 54a of the negative pressure communication path 54. Therefore, even when the automatic cock 52 is not disposed above the crankcase 12, the intrusion can be suppressed of the oil mist into the negative pressure introducing inlet 52g. The automatic cock 52 does not need to be disposed above the crankcase 12 and, therefore, the positions of the automatic cock 52 and the fuel tank 51 can arbitrarily be set to be at positions at which no thermal influence is received that is caused by the heat dissipation from the internal combustion engine 10. Therefore, the degree of freedom of the disposition of the fuel supplying apparatus 50 can be increased.

Even when the height is limited for disposing the fuel tank 51, the capacity of the fuel tank 51 can sufficiently be secured by disposing the fuel tank 51 at a proper position. For example, even when the internal combustion engine 10 and the fuel supplying apparatus 50 are incorporated as one unit and the height of the unit as a whole is limited, the capacity of the fuel tank 51 can sufficiently be secured by properly setting the position of the fuel tank 51.

According to the embodiment, the point 31e at which the purge path 55 is connected to the air cleaner 31, that is, the communication opening 31e of the cleaning chamber 31d is located at the position that is lower than that of the branching point 54a. Therefore, the oil mist gathering at the lowest point 54a of the negative pressure communication path 54 enters the communication opening 31e passing through the purge path 55 due to the gravity. The oil mist entering the communication opening 31e is combusted in the combustion chamber 15. As a result, the intrusion of the oil mist into the negative pressure introducing inlet 52g can further be suppressed.

Furthermore, according to the embodiment, the purge path 55 has the airflow resistance increasing unit 31f and, therefore, the airflow resistance in the purge path 55 is larger than that in the negative pressure communication path 54. Therefore, the pressure difference is not excessive between the internal pressure Pa of the negative pressure communication path 54 and the internal pressure Pb of the purge path 55. Because the pressure difference is proper, the negative pressure state in the negative pressure communication path 54 is not cancelled by the pressure of the air that flows from the purge path 55 to the negative pressure communication path 54. Therefore, the negative pressure can be secured in the negative pressure communication path 54 to cause the automatic cock 52 to open and, therefore, the automatic cock 52 can be caused to operate to suitably open and close.

Yet furthermore, according to the embodiment, the purge path 55 has, inside the communication opening 31e, the airflow resistance increasing unit 31f to set the airflow resistance of the purge path 55 to be higher than that of the negative pressure communication path 54. Therefore, the pressure loss of the purge path 55 as a whole is increased by increasing the airflow resistance of the purge path 55 (including the communication opening 31e) using the airflow resistance increasing unit 31f. As a result, at the branching point 54a at which the purge path 55 branches from the negative pressure communication path 54, the pressure difference can be set to be an optimal value between the internal pressure Pa of the negative pressure communication path 54 and the internal pressure Pb of the purge path 55. Because the pressure difference is proper, the negative pressure state in the negative pressure communication path 54 is not offset by the pressure of the air that flows from the purge path 55 to the negative pressure communication path 54. The negative pressure in the negative pressure communication path 54 can sufficiently be secured that acts to cause the automatic cock 52 to open and, therefore, the automatic cock 52 can be operated to suitably open and close.

Figures 8A, 8B:
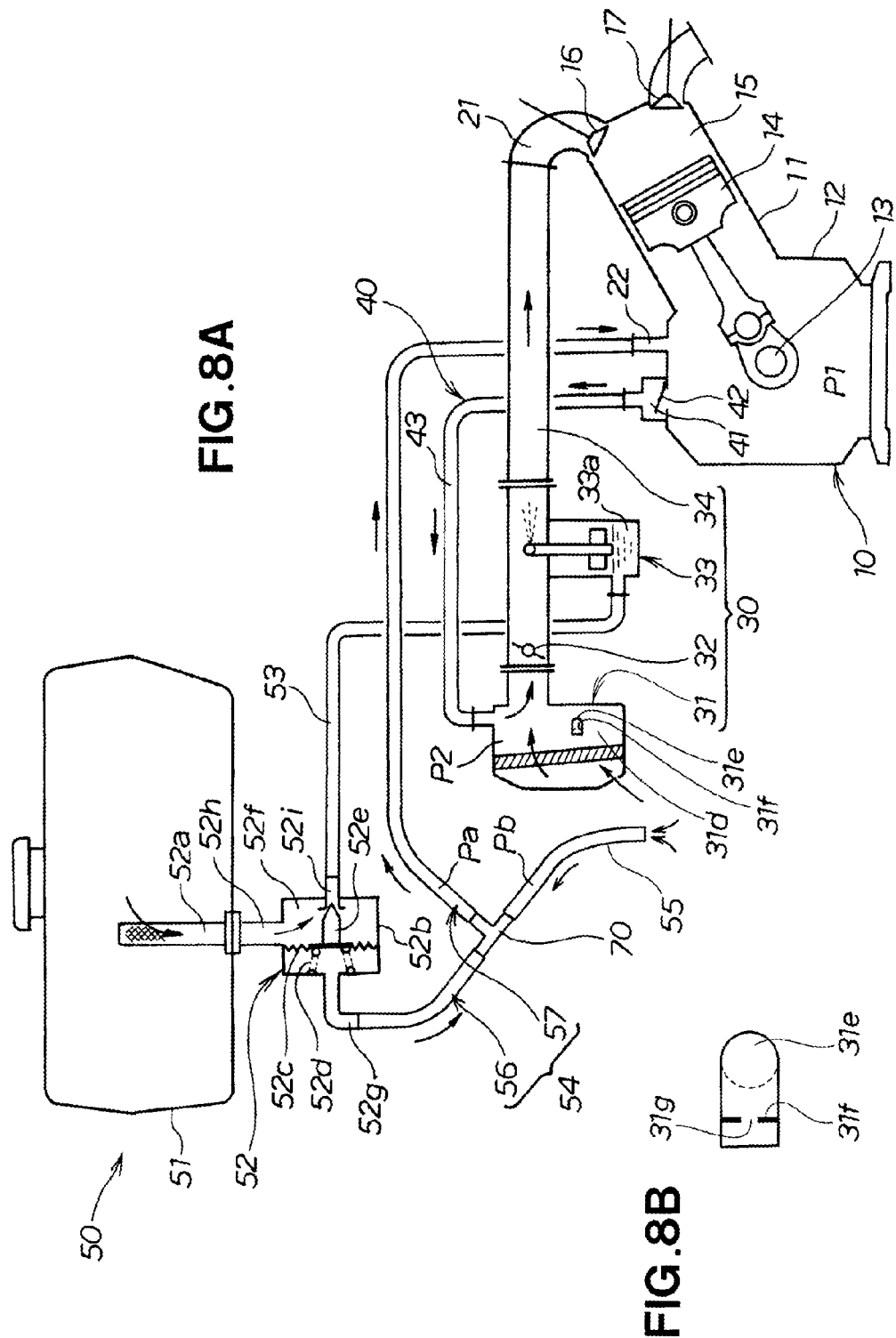
FIGS. 8A and 8B are views showing the purge path of FIG. 1 as detached from the communication opening.

FIG. 8A depicts the state where the purge path 55 is detached from the communication opening 31e. FIG. 8B depicts in an enlarged form the communication opening 31e that is depicted in FIG. 8A.

Describing with reference to FIGS. 8A and 8B, the airflow resistance increasing unit 31f is retained only in the inside of the communication opening 31e, and no such unit is retained in the purge path 55. Therefore, when the purge path 55 is detached from the communication opening 31e or the negative pressure communication path 54, or the purge path 55 is broken due to some factor, the external air receives no intake resistance generated by the airflow resistance increasing unit 31f and is, as it is, sucked into the negative pressure communication path 54 passing through the purge path 55. The negative pressure in the negative pressure communication path 54 is offset by the pressure of the external air (the atmospheric pressure) flowing into the negative pressure communication path 54. Therefore, the negative pressure in the negative pressure communication path 54 can not sufficiently be secured, that acts to cause the automatic cock 52 to open and, therefore, the automatic cock 52 automatically closes. The supply of the fuel from the fuel tank 51 to the internal combustion engine 10 is blocked and, therefore, the internal combustion engine 10 stops its operation. An operator who operates the internal combustion engine 10 can quickly get aware of the stoppage of the operation of the internal combustion engine 10 without intending to and, therefore, the operator can quickly cope with the stoppage.

In addition, the negative pressure state in the negative pressure communication path 54 is cancelled and, therefore, dust included in the external air is not sucked into the negative pressure communication path 54 and does not intrude into the crankcase 12. The negative pressure state in the cleaning chamber 31d is cancelled due to the stoppage of the operation of the internal combustion engine 10 and, therefore, the dust included in the external air does not intrude from the communication opening 31e into the combustion chamber 15 through the cleaning chamber 31d. Therefore, the airflow resistance increasing unit 31f is advantageous for improving the durability of the internal combustion engine 10.

The fuel supplying apparatus 50 according to the present invention is suitable to be used in a configured article that has the internal combustion engine 10 and the fuel tank 51 incorporated therein as one unit, for example, a small generator that is driven by an internal combustion engine.

Obviously, various minor changes and modifications of the present invention are possible in light of the above teaching. It is therefore to be understood that within the scope of the appended claims the invention may be practiced otherwise than as specifically described.

What is claimed is:

1. A fuel supplying apparatus comprising:
   a fuel tank for storing a fuel to be supplied to an internal combustion engine;
   an automatic cock connected to the fuel tank and having a negative pressure introducing inlet;
   a negative pressure communication path connecting the negative pressure introducing inlet with a crankcase of the internal combustion engine; and
   a fuel supply path that is opened by a negative pressure, generated in the crankcase, to supply the fuel from the fuel tank to the internal combustion engine,
   wherein the negative pressure communication path communicates with a communication opening of an air cleaner through a purge path branched from the negative pressure communication path,
   the communication opening is disposed in a cleaning chamber formed in the air cleaner so that air filtered by an air filter of the air cleaner flows into the communication opening, and
   an airflow resistance increasing unit for setting an airflow resistance of the purge path to be larger than an airflow resistance of the negative pressure communication path is disposed only in an inner side of the communication opening.

2. The fuel supplying apparatus of claim 1, wherein the negative pressure communication path has a point at which the purge path branches therefrom, and the branching point is set to be at a lowest point of the negative pressure communication path so as to render the branching point capable of collecting oil mist intruding from the crankcase.

3. The fuel supplying apparatus of claim 2, wherein the communication opening is located at a lower position than that of the branching point.

* * * * *